United States Patent
Park et al.

(10) Patent No.: US 9,148,858 B2
(45) Date of Patent: Sep. 29, 2015

(54) APPARATUS AND METHOD FOR CONTROLLING UPLINK TRANSMISSION POWER IN A MOBILE COMMUNICATION SYSTEM

(75) Inventors: Jeong-Ho Park, Seoul (KR); Jae-Yun Ko, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 623 days.

(21) Appl. No.: 13/179,829

(22) Filed: Jul. 11, 2011

(65) Prior Publication Data

US 2012/0009969 A1    Jan. 12, 2012

(30) Foreign Application Priority Data

Jul. 12, 2010  (KR) .................. 10-2010-0066882
Jul. 14, 2010  (KR) .................. 10-2010-0068073

(51) Int. Cl.
| | | |
|---|---|---|
| H04W 52/04 | (2009.01) | |
| H04W 52/14 | (2009.01) | |
| H04W 52/10 | (2009.01) | |
| H04W 52/24 | (2009.01) | |
| H04W 52/36 | (2009.01) | |
| H04W 52/50 | (2009.01) | |

(52) U.S. Cl.
CPC ............ *H04W 52/146* (2013.01); *H04W 52/10* (2013.01); *H04W 52/241* (2013.01); *H04W 52/242* (2013.01); *H04W 52/243* (2013.01); *H04W 52/362* (2013.01); *H04W 52/50* (2013.01)

(58) Field of Classification Search
CPC ...... H04W 52/24; H04W 52/50; H04W 28/04

USPC ......................................................... 455/522
See application file for complete search history.

(56) References Cited

U.S. PATENT DOCUMENTS

| | | | |
|---|---|---|---|
| 6,948,184 B1* | 9/2005 | Del Sol et al. ................. | 725/111 |
| 7,164,660 B2* | 1/2007 | Baker et al. .................... | 370/318 |
| 7,558,535 B2* | 7/2009 | Cho et al. ........................ | 455/69 |
| 7,961,641 B1* | 6/2011 | Choi et al. ..................... | 370/252 |

(Continued)

FOREIGN PATENT DOCUMENTS

| | | |
|---|---|---|
| CN | 101485115 A | 7/2009 |
| EP | 1 876 854 A1 | 1/2008 |

(Continued)

OTHER PUBLICATIONS

IEEE Standard 802.16-2009 (pp. 319-325; 683-685; 1072-1073).*

(Continued)

*Primary Examiner* — Hai V Nguyen
(74) *Attorney, Agent, or Firm* — Jefferson IP Law, LLP

(57) ABSTRACT

A method and apparatus for controlling uplink transmission power in a mobile communication system are provided. In the method, an Advanced Mobile Station (AMS) determines uplink transmission power based on a measured path loss, an uplink noise and interference level received from an Advanced Base Station (ABS), a target Signal-to-Noise and Interference Ratio (SINR), and an offset. An initial offset value is determined based on a number of retransmissions of an initial ranging code performed until an initial ranging process is completed, a transmission power unit used for retransmission of the initial ranging code, and a power correction value received from the ABS upon completion of the initial ranging process with the ABS.

28 Claims, 7 Drawing Sheets

(56) References Cited

U.S. PATENT DOCUMENTS

| | | | |
|---|---|---|---|
| 7,974,252 B2 * | 7/2011 | Lim et al. | 370/341 |
| 8,023,897 B2 | 9/2011 | Cho et al. | |
| 8,139,532 B2 * | 3/2012 | Lim et al. | 370/329 |
| 8,359,059 B2 * | 1/2013 | Kim et al. | 455/522 |
| 8,472,993 B2 * | 6/2013 | Yang et al. | 455/522 |
| 8,571,593 B2 * | 10/2013 | Lee et al. | 455/522 |
| 8,675,602 B2 * | 3/2014 | Yang et al. | 370/331 |
| 2001/0038619 A1 * | 11/2001 | Baker et al. | 370/335 |
| 2002/0168994 A1 | 11/2002 | Terry et al. | |
| 2005/0099973 A1 | 5/2005 | Qiu et al. | |
| 2005/0195791 A1 * | 9/2005 | Sung et al. | 370/342 |
| 2005/0197171 A1 | 9/2005 | Son et al. | |
| 2007/0058524 A1 * | 3/2007 | Modlin et al. | 370/208 |
| 2007/0091815 A1 | 4/2007 | Tinnakornsrisuphap et al. | |
| 2007/0149238 A1 | 6/2007 | Das et al. | |
| 2007/0202882 A1 | 8/2007 | Ju et al. | |
| 2009/0052585 A1 * | 2/2009 | Song et al. | 375/340 |
| 2009/0109912 A1 * | 4/2009 | DiGirolamo et al. | 370/329 |
| 2009/0325627 A1 | 12/2009 | Lee | |
| 2010/0124194 A1 * | 5/2010 | Chun et al. | 370/329 |
| 2010/0150099 A1 * | 6/2010 | Chen et al. | 370/330 |
| 2011/0090856 A1 * | 4/2011 | Cho et al. | 370/329 |
| 2011/0141926 A1 | 6/2011 | Damnjanovic et al. | |
| 2011/0171949 A1 * | 7/2011 | Liao et al. | 455/422.1 |
| 2011/0188427 A1 | 8/2011 | Ishii | |
| 2012/0140722 A1 * | 6/2012 | Lim et al. | 370/329 |
| 2012/0327804 A1 * | 12/2012 | Park et al. | 370/252 |
| 2013/0003665 A1 * | 1/2013 | Pelletier et al. | 370/329 |
| 2013/0039341 A1 * | 2/2013 | Kim et al. | 370/331 |

FOREIGN PATENT DOCUMENTS

| | | |
|---|---|---|
| JP | 2005-142968 A | 6/2005 |
| JP | 2007-525927 A | 9/2007 |
| KR | 10-2008-0047450 A | 5/2008 |
| KR | 10-2008-0059326 A | 6/2008 |
| KR | 10-2010-0018296 A | 2/2010 |
| WO | 2010/018820 A1 | 2/2010 |

OTHER PUBLICATIONS

Park et al., U.S. Appl. No. 61/315,014, filed Mar. 18, 2010.*
Park et al., U.S. Appl. No. 61/311,746, filed Mar. 18, 2010.*
Kim et al., U.S. Appl. No. 61/303,318, filed Feb. 11, 2010.*
IEEE Standard for Local and Metropolitan Area Networks Part 16: Air Interface for Broadband Wireless Access Systems; IEEE Std 802.16-2009 (Revision of IEEE Std 802.16-2204), IEEE Standard, IEEE, Piscataway, NJ, USA, May 29, 2009, pp. 319-325; 683-685; 1072-1073, XP002659802, ISBN: 978-0-7381-5919-5.*
Part 16: Air Interface for Broadband Wireless Access System, IEEE Standard for Local and Metropolitan Area Networks, XP-002659802, IEEE Std 802.16-2009, May, 29, 2009.
Part 16: Air Interface for Fixed and Mobile Broadband Wireless Access Systems, IEEE WirelessMAN 802.16, IEEE P802.16m/D6, Draft Amendment to IEEE Standard for Local and metropolitan area networks, New York, USA, May 22, 2010.
Jeongho Park et al., Proposed Text on Power Control Section of the IEEE802.16m/D3Annendunent (163.9.4), IEEE C802. 16m-09/2846r2, IEEE 802.16 Task Group m (TGm), Jan. 12, 2010.

* cited by examiner

APPARATUS AND METHOD FOR CONTROLLING UPLINK TRANSMISSION POWER IN A MOBILE COMMUNICATION SYSTEM

PRIORITY

This application claims the benefit under 35 U.S.C. §119(a) of a Korean patent application filed in the Korean Intellectual Property Office on Jul. 12, 2010 and assigned Serial No. 10-2010-0066882 and a Korean patent application filed in the Korean Intellectual Property Office on Jul. 14, 2010 and assigned Serial No. 10-2010-0068073, the entire disclosure of each of which is hereby incorporated by reference.

BACKGROUND OF THE INVENTION

1. Field of the Invention

The present invention relates to an apparatus and method for controlling uplink transmission power in a mobile communication system. More particularly, the present invention relates to controlling uplink transmission power by compensating for the difference between a downlink path loss and an uplink path loss in a mobile communication system.

2. Description of the Related Art

To increase system capacity and improve service quality, a mobile communication system adopts downlink and uplink transmission power control schemes. However, the uplink transmission power control scheme of current mobile communication systems was designed with no regard to the disparity between a downlink path loss and an uplink path loss. This means that the conventional uplink transmission power control scheme is based on the premise of the same downlink and uplink path loss.

A mobile communication system such as a Frequency Division Duplexing (FDD) communication system may operate in different operation frequency bands, or a downlink gain may be different from an uplink gain in an area managed by a repeater. The FDD communication system may be, for example, an Institute of Electrical and Electronics Engineers (IEEE) 802.16m communication system based on Orthogonal Frequency Division Multiple Access (OFDMA).

Despite the possibility of different downlink and uplink path losses in case of different operation frequency bands or in case of different downlink and uplink gains, the conventional uplink transmission power control scheme was designed on the assumption that the downlink path loss is equal to the uplink path loss. Accordingly, if the downlink path loss is different from the uplink path loss, uplink transmission power control is not effective.

SUMMARY OF THE INVENTION

Aspects of the present invention are to address at least the above-mentioned problems and/or disadvantages and to provide at least the advantages described below. Accordingly, an aspect of the present invention is to provide an apparatus and method for controlling uplink transmission power in a mobile communication system.

Another aspect of the present invention is to provide an apparatus and method for controlling uplink transmission power by compensating for the difference between a downlink path loss and an uplink path loss in a mobile communication system.

In accordance with an aspect of the present invention, a method for controlling uplink transmission power at an Advanced Mobile Station (AMS) in a mobile communication system is provided. The method includes determining uplink transmission power based on a measured path loss, an uplink noise and interference level received from an Advanced Base Station (ABS), a target Signal-to-Noise and Interference Ratio (SINR), and an offset. An initial offset value is determined based on a number of retransmissions of an initial ranging code performed until an initial ranging process is completed, a transmission power unit used for retransmission of the initial ranging code, and a power correction value received from the ABS upon completion of the initial ranging process with the ABS.

In accordance with another aspect of the present invention, a method for supporting uplink transmission power control of an AMS at an ABS in a mobile communication system is provided. The method includes transmitting a power correction value to the AMS, upon completion of an initial ranging process with the AMS, and receiving a Ranging Request (RNG-REQ) message, including an initial offset value used for the AMS to determine uplink transmission power. The initial offset value is determined based on a number of retransmissions of an initial ranging code performed until the initial ranging process is completed, a transmission power unit used for retransmission of the initial ranging code, and the power correction value received from the ABS upon completion of the initial ranging process with the ABS.

In accordance with another aspect of the present invention, an AMS in a mobile communication system is provided. The AMS includes a controller for determining uplink transmission power using a measured path loss, an uplink noise and interference level received from an ABS, a target SINR, and an offset. An initial offset value is determined based on a number of retransmissions of an initial ranging code performed until an initial ranging process is completed, a transmission power unit used for retransmission of the initial ranging code, and a power correction value received from the ABS upon completion of the initial ranging process with the ABS.

In accordance with another aspect of the present invention, an ABS in a mobile communication system is provided. The ABS includes a transmitter for transmitting a power correction value to an AMS, upon completion of an initial ranging process with the AMS, and a receiver for receiving an RNG-REQ message including an initial offset value used for the AMS to determine uplink transmission power. The initial offset value is determined based on a number of retransmissions of an initial ranging code performed until the initial ranging process is completed, a transmission power unit used for retransmission of the initial ranging code, and the power correction value received from the ABS upon completion of the initial ranging process with the ABS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
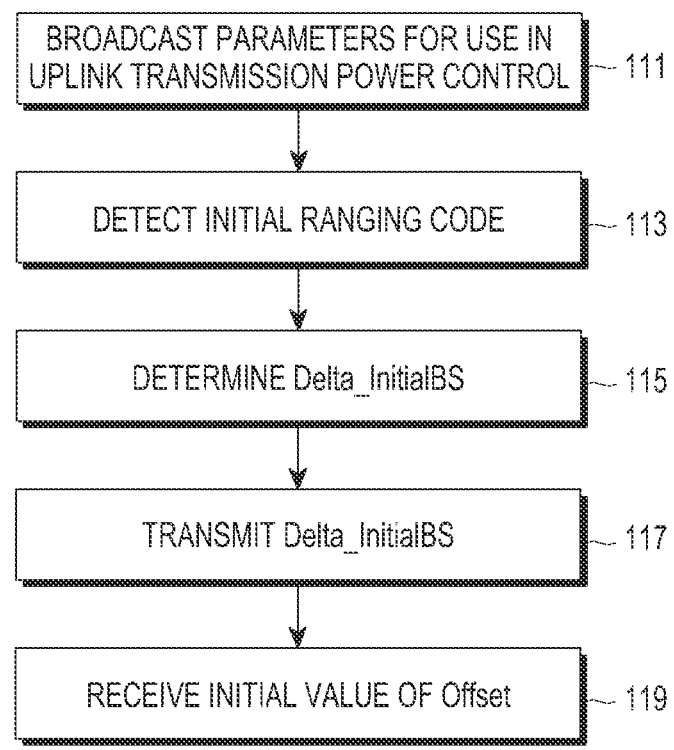
FIG. 1 is a flowchart illustrating an initial ranging process-uplink transmission power control operation of an Advanced Base Station (ABS) in an Institute of Electrical and Electronics Engineers (IEEE) 802.16m communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for controlling uplink transmission power in a mobile communication system. Exemplary embodiments of the present invention also provide an apparatus and method for controlling uplink transmission power by compensating for the difference between a downlink path loss and an uplink path loss in a mobile communication system.

The following description is given on the assumption that an Institute of Electrical and Electronics Engineers (IEEE) 802.16m communication system based on Orthogonal Frequency Division Multiple Access (OFDMA) is being used as an example of the mobile communication system. The apparatus and method for controlling uplink transmission power according to exemplary embodiments of the present invention is applicable to other mobile communication systems as well as the IEEE 802.16m communication system. Furthermore, the apparatus and method for controlling uplink transmission power according to exemplary embodiments of the present invention is useful for a mobile communication system experiencing different downlink and uplink path losses.

An uplink transmission power control scheme used in a current IEEE 802.16m communication system is expressed as $$P[dBm] = L + SINR_{Target} + NI + \text{Offset} \quad (1)$$

where P denotes an uplink transmission power, L denotes a downlink path loss measured by an Advanced Mobile Station (AMS), $SINR_{Target}$ denotes a target Signal-to-Interference and Noise Ratio (SINR) for a signal received at an Advanced Base Station (ABS), NI denotes an uplink noise and interference level measured by the ABS, and Offset denotes a power offset. The uplink noise and interference level NI is broadcast by the ABS.

$SINR_{Target}$ is determined in a different manner depending on the AMS transmits a data signal or a control signal. The ABS determines a target SINR for each control signal, $SINR_{Target}$ and broadcasts the target SINR $SINR_{Target}$. In addition, the ABS determines a target SINR for a data signal $SINR_{Target}$ by equation (2) and transmits the target SINR $SINR_{Target}$ to the AMS.

$$SINR_{Target} = 10 \cdot \log 10(\max(10^{(SINR_{MIN}[dB])/10}, \gamma IoT \cdot SIR_{DL} - \alpha)) - \beta \cdot 10 \log 10(TNS) \quad (2)$$

where $SINR_{MIN}$ denotes an SINR corresponding to a minimum data rate of the AMS set and broadcast by the ABS, $\gamma IoT$ denotes a control factor used to control uplink Interference over Thermal Noise (IoT), $SIR_{DL}$ denotes a downlink Signal-to-Interference Ratio (SIR) measured by the AMS, $\alpha$ denotes a control factor determined in consideration of the number of antennas used by the ABS, $\beta$ denotes a control factor for power normalization when the ABS receives a data signal from the AMS in the form of multiple streams, and TNS (Total Number of Streams) denotes the total number of streams. If the IEEE 802.16m communication system uses a Single User Multiple Input Multiple Output (SU-MIMO) scheme, TNS denotes the total number of streams received from the AMS. If the IEEE 802.16m communication system uses a Multi-User Multiple Input Multiple Output (MU-MIMO) scheme, TNS denotes the total number of streams received from a plurality of AMSs.

In equation (1), Offset may be classified into $\text{Offset}_{Data}$ or $\text{Offset}_{Control}$ depending on whether the AMS transmits a data signal or a control signal. $\text{Offset}_{Data}$ represents Offset when the AMS transmits a data signal and $\text{Offset}_{Control}$ represents Offset when the AMS transmits a control signal. $\text{Offset}_{Data}$ and $\text{Offset}_{Control}$ may be updated by signaling in the form of a message. If the AMS currently stores $\text{Offset}_{Data\_C}$ and $\text{Offset}_{Control\_C}$ representing current $\text{Offset}_{Data}$ and $\text{Offset}_{Control}$ upon receipt of $\text{Offset}_{Data}$ new and $\text{Offset}_{Control}$ new from the ABS, the AMS updates $\text{Offset}_{Data\_C}$ and $\text{Offset}_{Control\_C}$ to $\text{Offset}_{Data}$ new and $\text{Offset}_{Control}$ new.

The uplink transmission power control scheme described as equation (1) was designed on the premise of equal downlink and uplink path losses. Accordingly, use of the uplink transmission power control scheme described as equation (1) may lead to the degradation of uplink transmission power control performance in an environment experiencing different downlink and uplink path losses as in the IEEE 802.16m communication system.

Accordingly, exemplary embodiments of the present invention provide methods for controlling uplink transmission power by compensating for the difference between downlink and uplink power losses. The uplink transmission power control methods according to exemplary embodiments of the present invention include an initial ranging process-uplink transmission power control method, a periodic ranging process-uplink transmission power control method, and a BandWidth Request (BW REQ) preamble code transmission process-uplink transmission power control method.

A description will first be given of the initial ranging process-uplink transmission power control method.

According to the initial ranging process-uplink transmission power control method, an AMS determines an initial value of Offset described in equation (1) so as to control its uplink transmission power by compensating for the difference between a downlink path loss and an uplink path loss after completing an initial ranging process. This operation is described below.

The uplink transmission power control scheme described in equation (1) is for an AMS that has completed an initial ranging process, that is, an AMS in connected mode. Accordingly, before the AMS completes the initial ranging process with an ABS, the AMS operates according to an uplink transmission power control scheme described as equation (3).

$$PTX\_IR\_MIN = EIRxPIR,\min + BS\_EIRP - RSS + (GRx\_MS - GTx\_MS) \quad (3)$$

where PTX_IR_MIN denotes transmission power with which the AMS transmits an initial ranging code to the ABS, EIRxPIR,min denotes a target reception power with which the ABS wants to receive a signal, BS_EIRP denotes total downlink transmission power of the ABS, RSS denotes a Received Signal Strength (RSS) measured by the AMS, GRx_MS denotes a reception gain of the AMS, and GTx_MS represents a transmission gain of the AMS. The ABS determines the target reception power EIRxPIR,min and broadcasts it.

The AMS performs the initial ranging process with the ABS using the uplink transmission power, PTX_IR_MIN determined by equation (3). The AMS transmits an initial ranging code with the transmission power PTX_IR_MIN to the ABS and receives a response signal for the transmitted initial ranging code from the ABS, thus completing the initial ranging process.

However, if the AMS fails to receive a response signal for the transmitted initial ranging code from the ABS within a predetermined time, the AMS retransmits the initial ranging code to the ABS with transmission power increased from the transmission power PTX_IR_MIN by a predetermined power unit. The AMS may retransmit the initial ranging code within a predetermined number of retransmissions.

Let the power unit used for retransmission of the initial ranging code be denoted by P_InitialStep (dB). Then, if the initial ranging code has been retransmitted N times in total, that is, the power unit P_InitialStep (dB) has been used N times in total, the AMS determines an initial value of Offset described in equation (1) according to $$\text{Offset}_{Data} = N \times P\_\text{InitialStep} + \text{Delta\_Initial}BS$$

$$\text{Offset}_{Control} = N \times P\_\text{InitialStep} + \text{Delta\_Initial}BS \quad (4)$$

where Delta_InitialBS denotes a power correction value set in the response signal for the initial ranging code, transmitted by the ABS, that is, an ABS-determined power correction value [dB]. For example, when the ABS determines that it is necessary to adjust the reception power of the initial ranging code received from the AMS, the ABS transmits the power correction value Delta_InitialBS in the response signal for the initial ranging code to the AMS.

If the ABS determines that it is not necessary to adjust the reception power of the initial ranging code, the ABS may not include the power correction value Delta_InitialBS in the response signal for the initial ranging code.

The ABS may transmit the power correction value Delta_InitialBS a plurality of times, for example, M times to the AMS until the initial ranging process is successful. On the assumption that the power correction value Delta_InitialBS has been transmitted M times, the AMS may determine the initial value of Offset by equation (5), taking into account the power correction value Delta_InitialBS transmitted M times.

$$\text{Offset}_{Data} = N \times P\_\text{InitialStep} + \Sigma \text{Delta\_Initial}BS(m)$$

$$\text{Offset}_{Control} = N \times P\_\text{InitialStep} + \Sigma \text{Delta\_Initial}BS(m) \quad (5)$$

where Delta_InitialBS(m) denotes an $m^{th}$ transmitted power correction value Delta_InitialBS where m=1, . . . , M.

The target reception power EIRxPIR,min for a received signal, that is, an initial ranging signal in equation (3) may be different from the sum of the target SINR $\text{SINR}_{Target}$ of an actual initial ranging channel and the uplink noise and interference level, NI. To compensate for the difference, the initial value of Offset may be determined by $$\text{Offset}_{Data} = PTX\_IR\_\text{Final} - (L + \text{SINR}_{Target} + NI) - 10\log 10(\text{NumSubcarrierRNG})$$

$$\text{Offset}_{Control} = PTX\_IR\_\text{Final} - (L + \text{SINR}_{Target} + NI) - 10\log 10(\text{NumSubcarrierRNG}) \pm P_{CDMA\_allocation} \quad (6)$$

where PTX_IR_Final may be given as $$PTX\_IR\_\text{Final} = PTX\_IR\_\text{MIN} + N \times P\_\text{InitialStep} + \Sigma \text{Delta\_Initial}BS(m) \quad (7)$$

In equation (6), $\text{SINR}_{Target}$ denotes the target SINR of a signal received at the ABS. A specific channel may be designated as a reference signal. In this case, $\text{SINR}_{Target}$ represents an SINR value required for a required error rate of the specific channel. For example, if a non-synchronous ranging channel is set as a reference channel, $\text{SINR}_{Target}$ should be set to a target SINR of the non-synchronous ranging channel $\text{SINR}_{Non-syncRanging}$.

In equation (6), NumSubcarrierRNG denotes the total number of subcarriers included in a bandwidth used for the initial ranging. $P_{CDMA\_allocation}$ denotes an uplink power correction value set by uplink resource allocation signaling from the ABS, for example, included in an Offcontrol field of a CDMA allocation Information Element (IE) transmitted by the ABS.

While it has been described with reference to equation (6) that the initial value of Offset is calculated using the uplink power correction value $P_{CDMA\_allocation}$ the initial value of Offset may also be determined in equation (6), neglecting the uplink power correction value $P_{CDMA\_allocation}$. The uplink transmission power control scheme of equation (1) may be represented as $$P[dBm] = L + \text{SINR}_{Target} + NI + \text{Offset\_initial\_default} + \text{Offset}MS \quad (8)$$

On the assumption that Offset_initial_default+OffsetMS is equal to Offset of equation (1), OffsetMS may be given as equation (9). That is, Offset_initial_default is set to a default value, for example, '0' in the initial ranging process as used in the current IEEE 802.16m communication system and the initial value of Offset of equation (1) is determined using OffsetMS $$\text{Offset}MS = N \times P\_\text{InitialStep} + \text{Delta\_Initial}BS \tag{9}$$

Although the AMS may determine OffsetMS based on N×P_InitialStep after N retransmissions of the initial ranging code, it may update OffsetMS using P_InitialStep at each initial ranging code retransmission, that is, at each ramping up, as described in equation (10) and, upon receipt of Delta_InitialBS each time, the AMS may additionally reflect Delta_InitialBS in the update, as described in equation (11).

$$\text{Offset}MS = \text{Offset}MS\_c + P\_\text{InitialStep} \tag{10}$$

$$\text{Offset}MS = \text{Offset}MS\_c + \text{Delta\_Initial}BS \tag{11}$$

where OffsetMS_c denotes a current value of OffsetMS.

Now a description will be given of the periodic ranging process-uplink transmission power control method.

According to the periodic ranging process-uplink transmission power control method, the AMS updates Offset described in equation (1) so as to control its uplink transmission power by compensating for the difference between a downlink path loss and an uplink path loss after completing a periodic ranging process. This operation is described below. The periodic ranging process is also referred to as 'synchronized ranging'.

The periodic ranging process is a process of transmitting a periodic ranging code according to a predetermined condition to an ABS by a connected-mode AMS and controlling the transmission power, frequency offset, and time offset of the AMS by the ABS. The AMS transmits a periodic ranging code with uplink transmission power P determined by equation (1) to the ABS and receives a response signal for the transmitted periodic ranging code from the ABS, thus completing the periodic ranging process.

However, if the AMS fails to receive a response signal for the transmitted periodic ranging code from the ABS within a predetermined time, the AMS retransmits the periodic ranging code to the ABS with transmission power increased from the transmission power P by a predetermined power unit. The AMS may retransmit the periodic ranging code within a predetermined number of retransmissions.

Let the power unit used for retransmission of the periodic ranging code be denoted by P_PeriodicStep [dB]. Then, if the periodic ranging code has been retransmitted N times in total, that is, the power unit P_PeriodicStep (dB) has been used N times in total, the AMS determines an initial value of Offset described in equation (1) according to $$\text{Offset}_{Data} = \text{Offset}_{Data}c + N \times P\_\text{PeriodicStep} + \text{DeltaPeriodic}BS$$

$$\text{Offset}_{Control} = \text{Offset}_{Control}\_c + N \times P\_\text{PeriodicStep} + \text{DeltaPeriodic}BS \tag{12}$$

where $\text{Offset}_{Data\_}c$ denotes $\text{Offset}_{Data}$ used shortly before the AMS performs the periodic ranging process, and $\text{Offset}_{Control\_}c$ denotes $\text{Offset}_{Control}$ used shortly before the AMS performs the periodic ranging process.

In equation (12), DeltaPeriodicBS denotes a power correction value set in the response signal for the periodic ranging code, transmitted by the ABS, that is, an ABS-determined power correction value [dB]. For example, when the ABS determines that it is necessary to adjust the reception power of the periodic ranging code received from the AMS, the ABS transmits the power correction value DeltaPeriodicBS in the response signal for the periodic ranging code to the AMS.

If the ABS determines that it is not necessary to adjust the reception power of the periodic ranging code, the ABS may not include the power correction value DeltaPeriodicBS in the response signal for the periodic ranging code.

The uplink transmission power control scheme of equation (1) may be represented as $$P[\text{dBm}] = L + \text{SINR}_{Target} + NI + \text{Offset\_periodic\_default} + \text{Offset}MS \tag{13}$$

On the assumption that Offset_periodic_default+OffsetMS is equal to Offset of equation (1), OffsetMS may be given as equation (14). Offset_periodic_default is Offset that the AMS has used shortly before the periodic ranging process and the AMS updates Offset of equation (1) using OffsetMS $$\text{Offset}MS = \text{Offset}MS\_c + N \times P\_\text{PeriodicStep} + \text{DeltaPeriodic}BS \tag{14}$$

Although the AMS may determine OffsetMS based on N×P_PeriodicStep after N retransmissions of the periodic ranging code, it may update OffsetMS using P_PeriodicStep at each periodic ranging code retransmission, that is, at each ramping up, as described in equation (15). Or upon receipt of DeltaPeriodicBS from the ABS each time, the AMS may update OffsetMS using DeltaPeriodicBS, as described in equation (16).

$$\text{Offset}MS = \text{Offset}MS\_c + P\_\text{PeriodicStep} \tag{15}$$

$$\text{Offset}MS = \text{Offset}MS\_c + \text{DeltaPeriodic}BS \tag{16}$$

where OffsetMS_c denotes a current value of OffsetMS.

Finally, a description will be given of the BW REQ preamble code transmission process-uplink transmission power control method.

According to the BW REQ preamble code transmission process-uplink transmission power control method, the AMS updates Offset described in equation (1) so as to control its uplink transmission power by compensating for the difference between a downlink path loss and an uplink path loss after completing a BW REQ preamble code transmission process. This operation is described below.

During the BW REQ preamble code transmission process, the AMS transmits a BW REQ preamble code with uplink transmission power P determined by equation (1) to the ABS and receives a response signal for the transmitted BW REQ preamble code from the ABS, thus completing the BW REQ preamble code transmission process.

However, if the AMS fails to receive a response signal for the transmitted BW REQ preamble code from the ABS within a predetermined time, the AMS retransmits the BW REQ preamble code to the ABS with transmission power increased from the transmission power P by a predetermined power unit. The AMS may retransmit the BW REQ preamble code within a predetermined number of retransmissions.

Let the power unit used for retransmission of the BW REQ preamble code be denoted by P_BWREQStep [dB]. Then, if the BW REQ preamble code has been retransmitted N times in total, that is, the power unit P_BWREQStep (dB) has been used N times in total, the AMS determines an initial value of Offset described in equation (1) according to $$\text{Offset}_{Data} = \text{Offset}_{Data}c + N \times P\_\text{BWREQStep} + \text{DeltaBWREQ}BS$$

$$\text{Offset}_{control} = \text{Offset}_{control}c + N \times P\_\text{BWREQStep} + \text{Delta-BWREQ}BS \tag{17}$$

where $\text{Offset}_{Data\_}c$ denotes $\text{Offset}_{Data}$ used shortly before the AMS performs the BW REQ preamble code transmission process, and Offset$_{Control\_}$c denotes Offset$_{Control}$ used shortly before the AMS performs the BW REQ preamble code transmission process.

In equation (17), DeltaBWREQ BS denotes a power correction value set in the response signal for the BW REQ preamble code, transmitted by the ABS, that is, an ABS-determined power correction value [dB]. For example, when the ABS determines that it is necessary to adjust the reception power of the BW REQ preamble code received from the AMS, the ABS transmits the power correction value DeltaBWREQ BS in the response signal for the BW REQ preamble code to the AMS.

If the ABS determines that it is not necessary to adjust the reception power of the BW REQ preamble code, the ABS may not include the power correction value DeltaBWREQ BS in the response signal for the BW REQ preamble code.

The uplink transmission power control scheme of equation (1) may be represented as $$P[\text{dBm}] = L + \text{SINR}_{Target} + NI + \text{Offset\_BWREQ\_default} + \text{Offset}MS \quad (18)$$

On the assumption that Offset_BWREQ_default+OffsetMS is equal to Offset of equation (1), OffsetMS may be given as equation (19). Offset_BWREQ_default is Offset that the AMS has used shortly before the BW REQ preamble code transmission process and the AMS updates Offset of equation (1) using OffsetMS $$\text{Offset}MS = \text{Offset}MS\_c + N \times P\_\text{BWREQStep} + \text{DeltaBWREQ } BS \quad (19)$$

Although the AMS may determine OffsetMS based on N×P_BWREQStep after N retransmissions of the BW REQ preamble code, it may update OffsetMS using P_BWREQStep at each BW REQ preamble code retransmission, that is, at each ramping up, as described in equation (20). Or upon receipt of DeltaBWREQ BS from the ABS each time, the AMS may determine OffsetMS using DeltaBWREQ BS, as described in equation (21).

$$\text{Offset}MS = \text{Offset}MS\_c + P\_\text{BWREQStep} \quad (20)$$

$$\text{Offset}MS = \text{Offset}MS\_c + \text{DeltaBWREQ } BS \quad (21)$$

where OffsetMS_c denotes a current value of OffsetMS.

The above description has been given of the process in which an AMS determines an initial Offset value in the initial ranging process uplink transmission power control method and updates the Offset value in the periodic ranging process uplink transmission power control method and the BW REQ preamble code transmission process uplink transmission power control method. The AMS should report its determined initial Offset value and updated Offset value to the ABS. How the AMS reports its determined initial Offset value and updated Offset value to the ABS is described below.

An initial ranging process-uplink transmission power control operation of an ABS in an IEEE 802.16m communication system according to an exemplary embodiment of the present invention is described below with respect to FIG. 1.

FIG. 1 is a flowchart illustrating an initial ranging process-uplink transmission power control operation of an ABS in an IEEE 802.16m communication system according to an exemplary embodiment of the present invention.

Referring to FIG. 1, the ABS broadcasts parameters for use in the uplink transmission power control scheme in step 111. Upon detection of an initial ranging code received from an AMS in step 113, the ABS determines a power correction value Delta_InitialBS based on the reception power of the detected initial ranging code in step 115 and transmits the determined power correction value Delta_InitialBS to the AMS in step 117. In step 119, the ABS receives a report of an initial value of Offset from the AMS.

An initial ranging process-uplink transmission power control operation of an AMS in an IEEE 802.16m communication system according to an exemplary embodiment of the present invention is described below with respect to FIG. 2.

Figure 2:
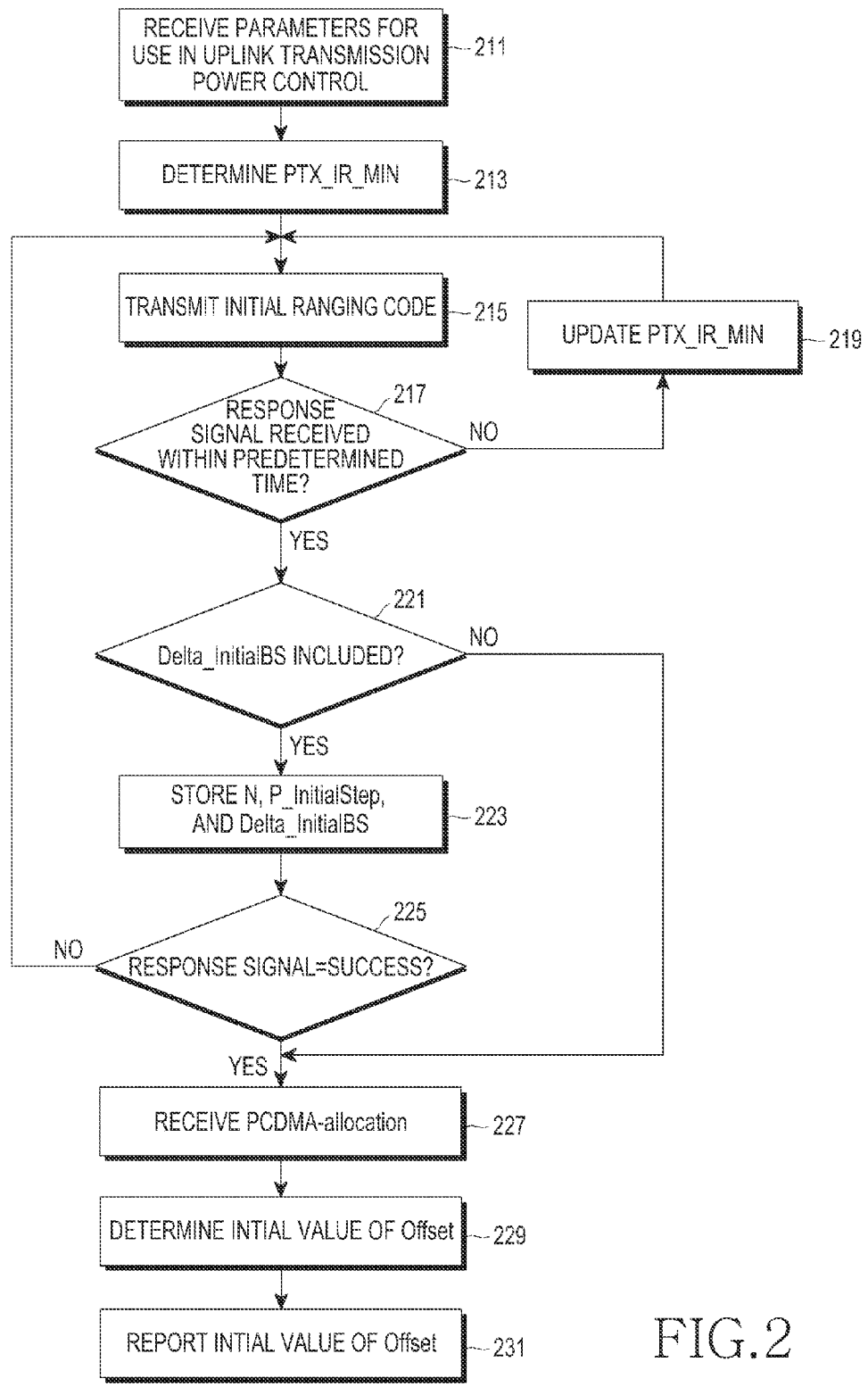
FIG. 2 is a flowchart illustrating an initial ranging process-uplink transmission power control operation of an Advanced Mobile Station (AMS) in an IEEE 802.16m communication system according to an exemplary embodiment of the present invention.

FIG. 2 is a flowchart illustrating an initial ranging process-uplink transmission power control operation of an AMS in an IEEE 802.16m communication system according to an exemplary embodiment of the present invention.

Referring to FIG. 2, the AMS receives parameters broadcast from an ABS, for use in the uplink transmission power control scheme in step 211 and determines uplink transmission power PTX_IR_MIN with which to transmit an initial ranging code in step 213. In step 215, the AMS transmits the initial ranging code with the uplink transmission power PTX_IR_MIN in an initial ranging opportunity. The AMS determines whether a response signal for the transmitted initial ranging code has been received from the ABS within a predetermined time in step 217. If the response signal for the transmitted initial ranging code has not been received from the ABS within the predetermined time, the AMS increases the transmission power PTX_IR_MIN by a transmission power unit used for the initial ranging process, P_InitialStep in step 219, and retransmits the initial ranging code with the increased transmission power PTX_IR_MIN in step 215.

Upon receipt of the response signal for the transmitted initial ranging code from the ABS within the predetermined time in step 217, the AMS determines whether a power correction value Delta_InitialBS is included in the response signal in step 221. If the power correction value Delta_InitialBS is included in the response signal, the AMS stores the number of retransmissions of the initial ranging code N, the transmission power unit P_InitialStep, and the power correction value Delta_InitialBS in step 223. The AMS determines whether the response signal for the transmitted initial ranging code indicates success in step 225. If the response signal indicates success, the AMS proceeds to step 227. On the other hand, if the response signal does not indicate success, the AMS returns to step 215.

If the power correction value Delta_InitialBS is not included in the response signal in step 221, the AMS jumps to step 227.

In step 227, the AMS receives an uplink power correction value $P_{CDMA\_allocation}$ from the ABS. The AMS determines an initial value of Offset in one of the methods described as equations (4), (5), and (6) in step 229 and reports the determined initial value of Offset to the ABS in step 231.

A periodic ranging process-uplink transmission power control operation of an ABS in an IEEE 802.16m communication system according to an exemplary embodiment of the present invention is described below with respect to FIG. 3.

Figure 3:
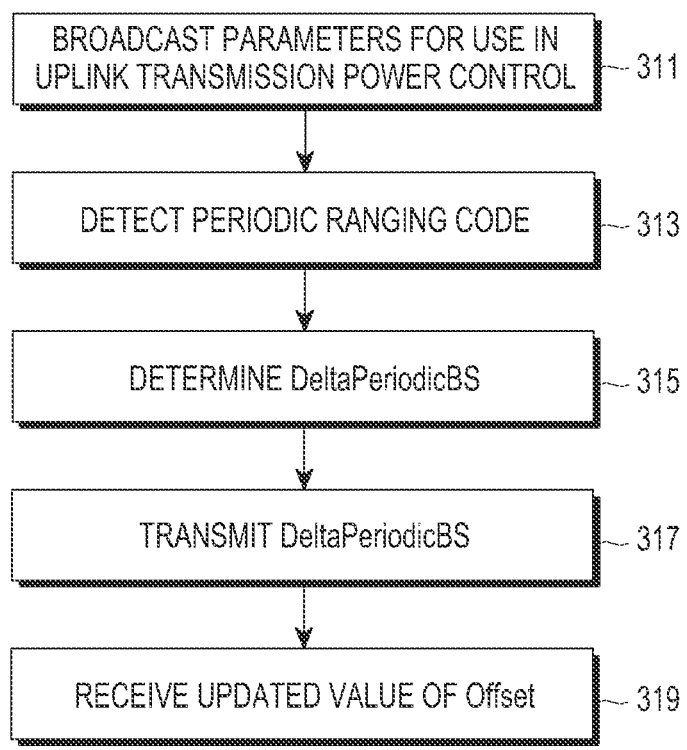
FIG. 3 is a flowchart illustrating a periodic ranging process-uplink transmission power control operation of an ABS in an IEEE 802.16m communication system according to an exemplary embodiment of the present invention.

FIG. 3 is a flowchart illustrating a periodic ranging process-uplink transmission power control operation of an ABS in an IEEE 802.16m communication system according to an exemplary embodiment of the present invention.

Referring to FIG. 3, the ABS broadcasts parameters for use in the uplink transmission power control scheme in step 311. Upon detection of a periodic ranging code received from an AMS in step 313, the ABS determines a power correction value DeltaPeriodicBS based on the reception power of the detected periodic ranging code in step 315 and transmits the determined power correction value DeltaPeriodicBS to the AMS in step 317. In step 319, the ABS receives a report of an updated value of Offset from the AMS.

A description of a periodic ranging process-uplink transmission power control operation of an AMS in an IEEE 802.16m communication system according to an exemplary embodiment of the present invention is described below with respect to FIG. 4.

Figure 4:
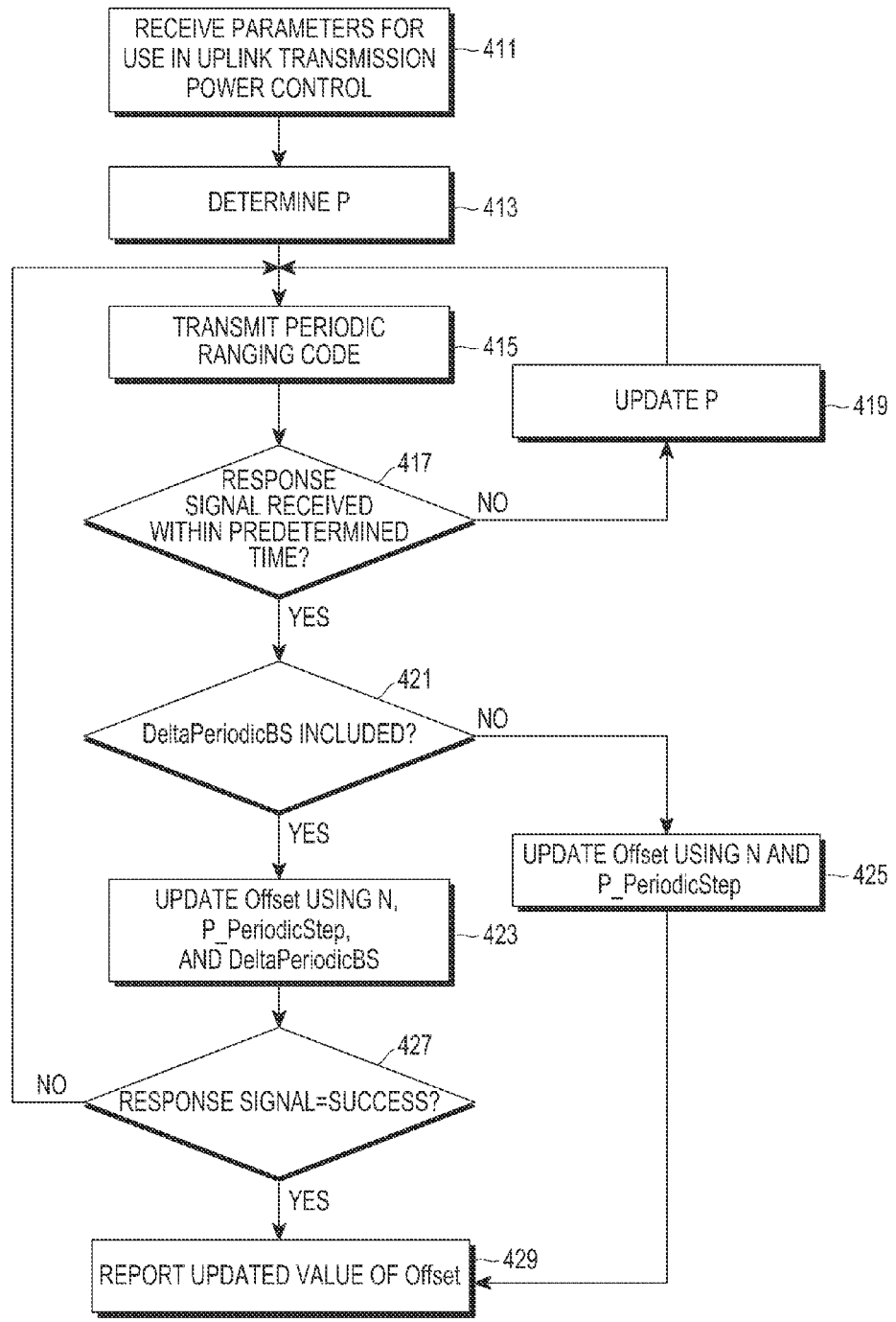
FIG. 4 is a flowchart illustrating a periodic ranging process-uplink transmission power control operation of an AMS in an IEEE 802.16m communication system according to an exemplary embodiment of the present invention.

FIG. 4 is a flowchart illustrating a periodic ranging process-uplink transmission power control operation of the AMS in the IEEE 802.16m communication system according to an exemplary embodiment of the present invention.

Referring to FIG. 4, the AMS receives parameters broadcast from an ABS, for use in the uplink transmission power control scheme in step 411 and determines uplink transmission power P with which to transmit a periodic ranging code in step 413. In step 415, the AMS transmits the periodic ranging code with the uplink transmission power P in a periodic ranging opportunity. The AMS determines whether a response signal for the transmitted periodic ranging code has been received from the ABS within a predetermined time in step 417. If the response signal for the transmitted periodic ranging code has not been received from the ABS within the predetermined time, the AMS updates the transmission power P by increasing it by a transmission power unit used for the periodic ranging process, P_PeriodicStep in step 419 and retransmits the periodic ranging code with the increased transmission power P in step 415.

Upon receipt of the response signal for the transmitted periodic ranging code from the ABS within the predetermined time in step 417, the AMS determines whether a power correction value DeltaPeriodicBS is included in the response signal in step 421. If the power correction value DeltaPeriodicBS is included in the response signal, the AMS updates a value of Offset using the number of retransmissions of the periodic ranging code N, the transmission power unit P_PeriodicStep, and the power correction value DeltaPeriodicBS in step 423. The AMS determines whether the response signal for the transmitted periodic ranging code indicates success in step 427. If the response signal indicates success, the AMS proceeds to step 429. On the other hand, if the response signal does not indicate success, the AMS returns to step 415.

If the power correction value DeltaPeriodicBS is not included in the response signal in step 421, the AMS goes to step 425. In step 425, the AMS updates the value of Offset using the number of retransmissions of the periodic ranging code, N and the transmission power unit P_PeriodicStep and proceeds to step 429. In step 429, the AMS reports an updated value of Offset to the ABS.

A BW REQ preamble code transmission process-uplink transmission power control operation of the ABS in an IEEE 802.16m communication system according to an exemplary embodiment of the present invention is described below with respect to FIG. 5.

Figure 5:
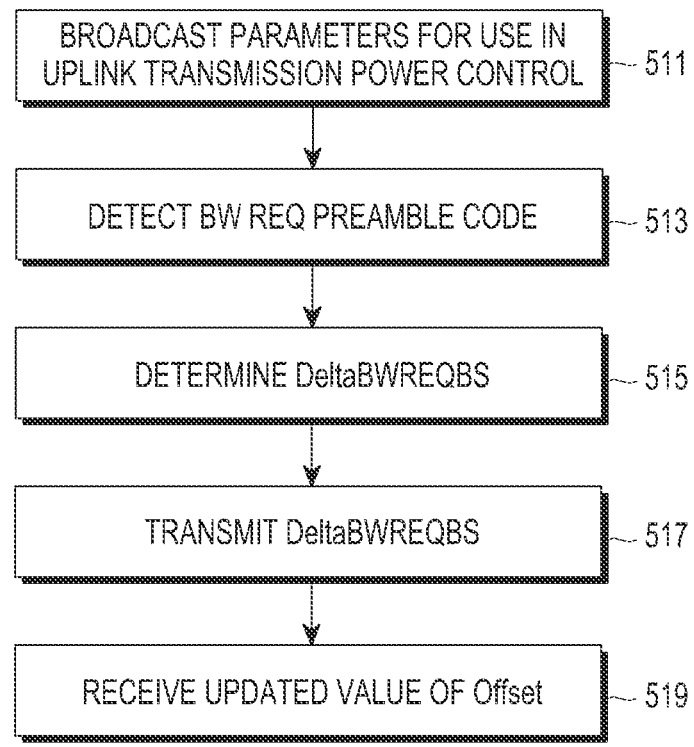
FIG. 5 is a flowchart illustrating a BandWidth Request (BW REQ) preamble code transmission process-uplink transmission power control operation of an ABS in an IEEE 802.16m communication system according to an exemplary embodiment of the present invention.

FIG. 5 is a flowchart illustrating a BW REQ preamble code transmission process-uplink transmission power control operation of an ABS in an IEEE 802.16m communication system according to an exemplary embodiment of the present invention.

Referring to FIG. 5, the ABS broadcasts parameters for use in the uplink transmission power control scheme in step 511. Upon detection of a BW REQ preamble code received from an AMS in step 513, the ABS determines a power correction value DeltaBWREQ BS based on the reception power of the detected BW REQ preamble code in step 515 and transmits the determined power correction value DeltaBWREQ BS to the AMS in step 517. In step 519, the ABS receives a report of an updated value of Offset from the AMS.

A BW REQ preamble code transmission process-uplink transmission power control operation of the AMS in the IEEE 802.16m communication system according to an exemplary embodiment of the present invention is described below with respect to FIG. 6.

Figure 6:
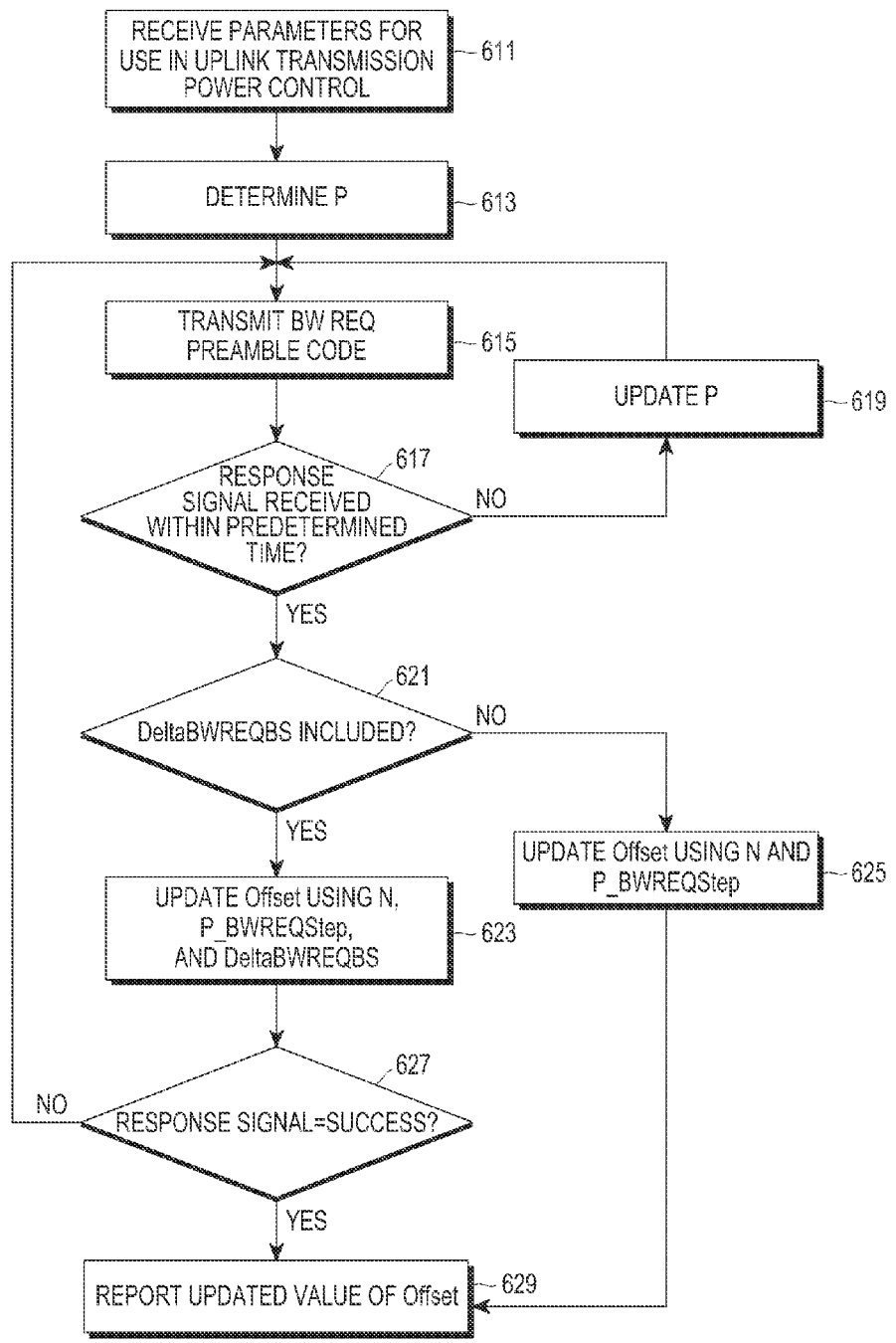
FIG. 6 is a flowchart illustrating a BW REQ preamble code transmission process-uplink transmission power control operation of an AMS in an IEEE 802.16m communication system according to an exemplary embodiment of the present invention.

FIG. 6 is a flowchart illustrating a BW REQ preamble code transmission process-uplink transmission power control operation of the AMS in the IEEE 802.16m communication system according to an exemplary embodiment of the present invention.

Referring to FIG. 6, the AMS receives parameters broadcast from an ABS, for use in the uplink transmission power control scheme in step 611 and determines uplink transmission power P with which to transmit a BW REQ preamble code in step 613. In step 615, the AMS transmits the BW REQ preamble code with the uplink transmission power P in a BW REQ preamble code transmission opportunity. The AMS determines whether a response signal for the transmitted BW REQ preamble code has been received from the ABS within a predetermined time in step 617. If the response signal for the transmitted BW REQ preamble code has not been received from the ABS within the predetermined time, the AMS increases the transmission power P by a transmission power unit used for the BW REQ preamble code transmission process, P_BWREQStep in step 619 and retransmits the BW REQ preamble code with the increased transmission power P in step 615.

Upon receipt of the response signal for the transmitted BW REQ preamble code from the ABS within the predetermined time in step 617, the AMS determines whether a power correction value DeltaBWREQ BS is included in the response signal in step 621. If the power correction value DeltaBWREQ BS is included in the response signal, the AMS updates a value of Offset using the number of retransmissions of the BW REQ preamble code N, the transmission power unit P_BWREQStep, and the power correction value DeltaBWREQ BS in step 623. The AMS determines whether the response signal for the transmitted BW REQ preamble code indicates success in step 627. If the response signal indicates success, the AMS proceeds to step 629. On the other hand, if the response signal does not indicate success, that is, if the response signal indicates continue, the AMS returns to step 615.

If the power correction value DeltaBWREQ BS is not included in the response signal in step 621, the AMS goes to step 625. In step 625, the AMS updates the value of Offset using the number of retransmissions of the BW REQ preamble code N, and the transmission power unit P_BWREQStep and proceeds to step 629. In step 629, the AMS reports an updated value of Offset to the ABS.

A configuration of an ABS in the IEEE 802.16m communication system according to an exemplary embodiment of the present invention is described below with reference to FIG. 7.

Figure 7:
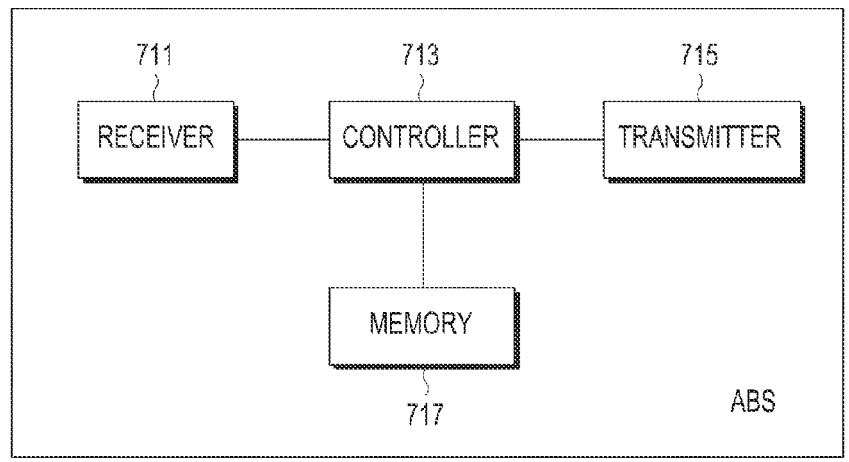
FIG. 7 is a block diagram of an ABS in an IEEE 802.16m communication system according to an exemplary embodiment of the present invention.

FIG. 7 is a block diagram of an ABS in an IEEE 802.16m communication system according to an exemplary embodiment of the present invention.

Referring to FIG. 7, the ABS includes a receiver 711, a controller 713, a transmitter 715, and a memory 717. The ABS may include other components not necessary to the implementation of exemplary embodiments of the present invention and thus not illustrated.

The controller 713 provides overall control to the ABS. The controller 713 controls all operations of the ABS regarding the initial ranging process-uplink transmission power control method, the periodic ranging process-uplink transmission power control method, and the BW REQ preamble code transmission process-uplink transmission power control method, which have been described before and thus will not be described again.

The controller 713 also controls transmission of parameters needed to control uplink transmission power through the transmitter 715 in the initial ranging process-uplink transmission power control method, the periodic ranging process-uplink transmission power control method, and the BW REQ preamble code transmission process-uplink transmission power control method, which have been described before and thus will not be described in detail again.

The receiver 711 receives from an AMS parameters needed to control uplink transmission power in the initial ranging process-uplink transmission power control method, the periodic ranging process-uplink transmission power control method, and the BW REQ preamble code transmission process-uplink transmission power control method, which have been described before and thus will not be described in detail again. The memory 717 stores information needed for the operations of the ABS.

While the receiver 711, the controller 713, the transmitter 715, and the memory 717 are shown in FIG. 7 as separate units, it is clearly to be understood that the receiver 711, the controller 713, the transmitter 715, and the memory 717 may be incorporated into a single unit.

A configuration of an AMS in an IEEE 802.16m communication system according to an exemplary embodiment of the present invention is described below with reference to FIG. 8.

Figure 8:
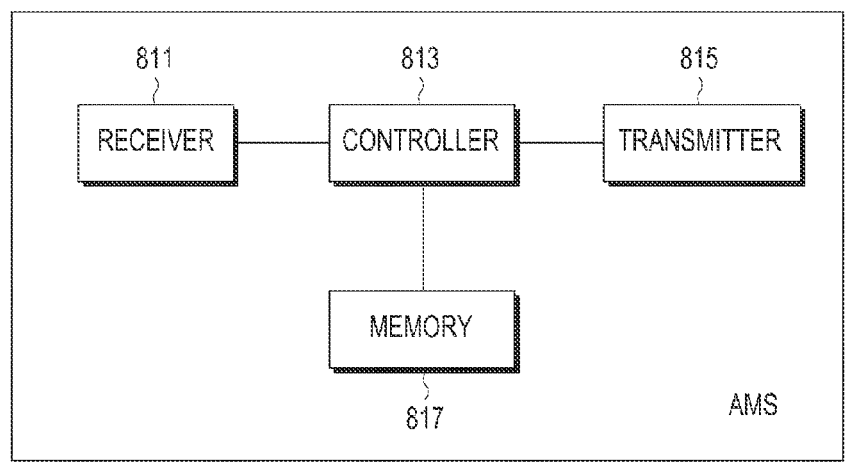
FIG. 8 is a block diagram of an AMS in an IEEE 802.16m communication system according to an exemplary embodiment of the present invention.

FIG. 8 is a block diagram of an AMS in an IEEE 802.16m communication system according to an exemplary embodiment of the present invention.

Referring to FIG. 8, the AMS includes a receiver 811, a controller 813, a transmitter 815, and a memory 817. The AMS may also include other components not necessary for implementing exemplary embodiments of the present invention and thus shown in FIG. 8 for clarity.

The controller 813 provides overall control to the AMS. The controller 813 controls all operations of the AMS regarding the initial ranging process-uplink transmission power control method, the periodic ranging process-uplink transmission power control method, and the BW REQ preamble code transmission process-uplink transmission power control method, which have been described before and thus will not be described in detail again.

In addition, the controller 813 controls transmission of parameters needed to control uplink transmission power through the transmitter 815 in the initial ranging process-uplink transmission power control method, the periodic ranging process-uplink transmission power control method, and the BW REQ preamble code transmission process-uplink transmission power control method, which have been described before and thus will not be described in detail again.

The receiver 811 receives from an ABS parameters needed to control uplink transmission power in the initial ranging process-uplink transmission power control method, the periodic ranging process-uplink transmission power control method, and the BW REQ preamble code transmission process-uplink transmission power control method, which have been described before and thus will not be described again. The memory 817 stores information needed for the operations of the AMS.

While the receiver 811, the controller 813, the transmitter 815, and the memory 817 are shown in FIG. 8 as separate units, it is clearly to be understood that the receiver 811, the controller 813, the transmitter 815, and the memory 817 may be incorporated into a single unit.

After successfully performing an initial ranging process, the AMS determines an initial value of Offset as described before and transmits a Ranging Request (RNG-REQ) message in uplink resources allocated by a CDMA allocation A-MAP IE. The AMS includes the initial value of Offset in the RNG-REQ message so that the ABS can determine the difference between an uplink path loss and a downlink path loss, calculated by the AMS and an actual transmission power of the AMS reflecting the difference between the uplink path loss and the downlink path loss. Accordingly, the ABS can perform scheduling accurately. According to an exemplary embodiment of the present invention, it is assumed that the AMS feeds back the initial value of Offset once in the RNG-REQ message, after succeeding in the initial ranging process. The initial value of Offset may be included in an Initial Offset for uplink power control (Offset$_{initial}$) field of the RNG-REQ message.

TABLE 1

| M/O | Attributes/Array of attributes | Size (bits) | Value/Notes | Conditions |
|---|---|---|---|---|
| O | Initial Offset for uplink power control (Offset$_{Initial}$) | 5 | The bit size represents power level ranging from ~15 dB (0x00) to 26 dB (0x1F) | The value is determined by AMS after successful initial ranging process |

In Table 1, Initial Offset for uplink power control (Offset) specifies a power level, for example, in 5 bits. The power level indicated by Initial Offset for uplink power control (Offset$_{initial}$) is determined by the AMS after a successful initial ranging process.

As is apparent from the above description of exemplary embodiments of the present invention, uplink transmission power can be controlled by compensating for the difference between a downlink path loss and an uplink path loss in a mobile communication system. Therefore, excess transmission failure and excess reception power can be prevented, thus increasing the overall performance of the mobile communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling uplink power at a mobile station (MS) in a mobile communication system, the method comprising:
    determining uplink power based on a path loss, an uplink noise and interference level, a target signal-to-interference and noise ratio (SINR), and an offset,
    wherein an initial value of the offset is determined based on a number of ramp-ups to be processed until an initial ranging process is completed, a power step size to ramp-up, and a power adjustment value received from a base station (BS).

2. The method of claim 1, wherein the initial value of the offset is expressed as the following equation, $$\text{Offset}_{Data} = \text{PTX\_IR\_Final} - (L + \text{SINR}_{Target} + NI) - 10\log 10(\text{NumSubcarrierRNG})$$

$$\text{Offset}_{Control} \text{PTX\_IR\_Final} - (L + \text{SINR}_{Target} + NI) - 10\log 10(\text{NumSubcarrierRNG})$$

where Offset$_{Data}$ denotes an initial value of the offset for a data signal if the uplink power is applied to the data signal, Offset$_{Control}$ denotes an initial value of the offset for a control signal if the uplink power is applied to the control signal, L denotes the path loss, SINR$_{target}$ denotes the target SINR, NI denotes the uplink noise and interference level, NumSubcarrierRNG denotes the total number of subcarriers included in a bandwidth used for initial ranging, and PTX_IR_Final is expressed as the following equation, $$\text{PTX\_IR\_Final} = \text{PTX\_IR\_MIN} + N \times P\_\text{InitialStep} + \Sigma \text{Delta\_InitialBS}(m)$$

where PTX_IR_MIN denotes a power with which the MS transmits an initial ranging code to the BS, N denotes the number of ramp-ups, P_InitialStep denotes a power step size, Delta_InitialBS denotes the power adjustment value, and Delta_InitialBS(m) denotes an $m^{th}$ power adjustment value received in the MS.

3. The method of claim 1, wherein the target SINR comprises a target SINR of a non-synchronous ranging channel.

4. The method of claim 1, wherein the offset comprises a value that compensates for a difference between a downlink path loss and an uplink path loss.

5. The method of claim 1, further comprising:
transmitting a ranging request (RNG-REQ) message including the initial value of the offset to the BS.

6. The method of claim 1, wherein the uplink noise and interference level and the offset are received from the BS.

7. The method of claim 1, wherein the power adjustment value is received through a response message.

8. A method for supporting, by a base station (BS) an uplink power control of a mobile station (MS) in a mobile communication system, the method comprising:
transmitting a power adjustment value to the MS; and
receiving an initial value of an offset from the MS,
wherein the initial value of the offset is determined based on a number of ramp-ups to be processed until an initial ranging process is completed, a power step size to ramp-up, and the power adjustment value.

9. The method of claim 8, further comprising:
transmitting an uplink noise and interference level, a target signal-to-interference and noise ratio (SINR), and an offset to the MS,
wherein the uplink power is determined based on a path loss, the uplink noise and interference level, the target SINR, and the offset, and
wherein the path loss is measured by the MS.

10. The method of claim 9, wherein the initial value of the offset is expressed as the following equation, $$\text{Offset}_{Data} = \text{PTX\_IR\_Final} - (L + \text{SINR}_{Target} + NI) - 10 \log 10(\text{NumSubcarrierRNG})$$

$$\text{Offset}_{Control} = \text{PTX\_IR\_Final} - (L + \text{SINR}_{Target} + NI) - 10 \log 10(\text{NumSubcarrierRNG})$$

where Offset$_{Data}$ denotes an initial value of the offset for a data signal if the uplink power is applied to the data signal, Offset$_{Control}$ denotes an initial value of the offset for a control signal if the uplink power is applied to the control signal, L denotes the path loss, SINR$_{Target}$ denotes the target SINR, NI denotes the uplink noise and interference level, NumSubcarrierRNG denotes the total number of subcarriers included in a bandwidth used for initial ranging, and PTX_IR_Final is expressed as the following equation, $$\text{PTX\_IR\_Final} = \text{PTX\_IR\_MIN} + N \times P\_\text{InitialStep} + \Sigma \text{Delta\_InitialBS}(m)$$

where PTX$_{13}$ IR_MIN denotes power with which the MS transmits an initial ranging code to the BS, N denotes the number of ramp-ups, P_InitialStep denotes a power step size, Delta_InitialBS denotes the power adjustment value, and Delta_InitialBS(m) denotes an $m^{th}$ power adjustment value received in the MS.

11. The method of claim 9, wherein the target SINR comprises a target SINR of a non-synchronous ranging channel.

12. The method of claim 9, wherein the offset comprises a value that compensates for a difference between a downlink path loss and an uplink path loss.

13. The method of claim 8, wherein the power adjustment value is transmitted through a response message.

14. The method of claim 8, wherein the initial value of the offset is received through a ranging request (RNG-REQ) message.

15. A mobile station (MS) in a mobile communication system, comprising:
a controller configured to determine uplink power based on a path loss, an uplink noise and interference level, a target signal-to-interference and noise ratio (SINR), and an offset,
wherein an initial value of the offset is determined based on a number of ramp-ups to be processed until an initial ranging process is completed, a power step size to ramp-up, and a power adjustment value received from a base station (BS).

16. The MS of claim 15, wherein the initial value of the offset is expressed as the following equation, $$\text{Offset}_{Data} = \text{PTX\_IR\_Final} - (L + \text{SINR}_{Target} + NI) - 10 \log 10(\text{NumSubcarrierRNG})$$

$$\text{Offset}_{Control} = \text{PTX\_IR\_Final} - (L + \text{SINR}_{Target} + NI) - 10 \log 10(\text{NumSubcarrierRNG})$$

where Offset$_{Data}$ denotes an initial value of the offset for a data signal if the uplink power is applied to the data signal, Offse$_{Control}$ denotes an initial value of the offset for a control signal if the uplink power is applied to the control signal, L denotes the path loss, SINR$_{target}$ denotes the target SINR, NI denotes the uplink noise and interference level, NumSubcarrierRNG denotes the total number of subcarriers included in a bandwidth used for initial ranging, and PTX_IR_Final is expressed as the following equation, $$\text{PTX\_IR\_Final} = \text{PTX\_IR\_MIN} + N \times P\_\text{InitialStep} + \Sigma \text{Delta\_InitialBS}(m)$$

where PTX_IR_MIN denotes power with which the MS transmits an initial ranging code to the BS, N denotes the number of ramp-ups, P_InitialStep denotes a power step size, Delta_InitialBS denotes the power adjustment value, and Delta_InitialBS(m) denotes an $m^{th}$ power adjustment value received in the MS.

17. The MS of claim 15, wherein the target SINR comprises a target SINR of a non-synchronous ranging channel.

18. The MS of claim 15, wherein the offset comprises a value that compensates for a difference between a downlink path loss and an uplink path loss.

19. The MS of claim 15, further comprising:
a transmitter configured to transmit a ranging request (RNG-REQ) message including the initial value of the offset to the BS.

20. The MS of claim 15, wherein the uplink noise and interference level and the offset are received from the BS.

21. The MS of claim 15, wherein the power adjustment value is received through a response message.

22. A base station (BS) in a mobile communication system, comprising:
- a transmitter configured to transmit a power adjustment value to a mobile station (MS); and
- a receiver configured to receive an initial value of an offset from the MS,
- wherein the initial value of the offset is determined based on a number of ramp-ups to be processed until an initial ranging process is completed, a power step size to ramp-up, and the power adjustment value.

23. The BS of claim 22, wherein the transmitter transmits an uplink noise and interference level, a target signal-to-interference and noise ratio (SINR), and an offset to the MS,
- wherein the uplink power is determined using a path loss, the uplink noise and interference level, the target SINR, and the offset, and
- wherein the path loss is measured by the MS.

24. The BS of claim 23, wherein the initial value of the offset is expressed as the following equation, $$\text{Offset}_{Data} = \text{PTX\_IR\_Final} - (L + \text{SINR}_{Target} + NI) - 10\log 10(\text{NumSubcarrierRNG})$$

$$\text{Offset}_{Control} = \text{PTX\_IR\_Final} - (L + \text{SINR}_{Target} + NI) - 10\log 10(\text{NumSubcarrierRNG})$$

where $\text{Offset}_{Data}$ denotes an initial value of the offset for a data signal if the uplink power is applied to the data signal, $\text{Offset}_{Control}$ denotes an initial value of the offset for a control signal if the uplink power is applied to the control signal, L denotes the path loss, $\text{SINR}_{Target}$ denotes the target SINR, NI denotes the uplink noise and interference level, NumSubcarrierRNG denotes the total number of subcarriers included in a bandwidth used for initial ranging, and PTX_IR_Final is expressed as the following equation, $$\text{PTX\_IR\_Final} = \text{PTX\_IR\_MIN} + N \times P\_\text{InitialStep} + \Sigma \text{Delta\_InitialBS}(m)$$

where PTX_IR_MIN denotes power with which the MS transmits an initial ranging code to the BS, N denotes the number of ramp-ups, P_InitialStep denotes a power step size, Delta_InitialBS denotes the power adjustment value, and Delta_InitialBS(m) denotes an $m^{th}$ power adjustment value received in the MS.

25. The BS of claim 23, wherein the target SINR comprises a target SINR of a non-synchronous ranging channel.

26. The BS of claim 23, wherein the offset comprises a value that compensates for a difference between a downlink path loss and an uplink path loss.

27. The BS of claim 22, wherein the power adjustment value is transmitted through a response message.

28. The BS of claim 22, wherein the initial value of the offset is received through a ranging request (RNG-REQ) message.

* * * * *